United States Patent
Bass et al.

[19]

[11] Patent Number: 6,041,375

[45] Date of Patent: Mar. 21, 2000

[54] METHOD AND SYSTEM FOR ENABLING NONDISRUPTIVE LIVE INSERTION AND REMOVAL OF FEATURE CARDS IN A COMPUTER SYSTEM

[75] Inventors: Brian Mitchell Bass, Apex; James Allison Hubbard; Price Ward Oman, both of Raleigh; Frank J. Pita, Cary, all of N.C.

[73] Assignee: International Business Machines Corporation, Armonk, N.Y.

[21] Appl. No.: 09/321,688

[22] Filed: May 28, 1999

Related U.S. Application Data

[63] Continuation of application No. 08/826,789, Apr. 7, 1997, Pat. No. 5,964,855.

[51] Int. Cl.$^7$ ........................................... G06F 13/00
[52] U.S. Cl. ........................................... 710/103
[58] Field of Search ........................... 710/102, 103

[56] References Cited

U.S. PATENT DOCUMENTS

| | | |
|---|---|---|
| 5,210,855 | 5/1993 | Bartol . |
| 5,310,998 | 5/1994 | Okuno ........................... 235/380 |
| 5,386,567 | 1/1995 | Lien et al. . |
| 5,432,916 | 7/1995 | Hahn et al. . |
| 5,530,810 | 6/1996 | Bowman . |
| 5,555,510 | 9/1996 | Verseput et al. . |
| 5,574,865 | 11/1996 | Pemberton . |
| 5,581,712 | 12/1996 | Herrman . |
| 5,584,030 | 12/1996 | Husak et al. . |
| 5,617,081 | 4/1997 | Madnick et al. ................ 340/825 |
| 5,636,347 | 6/1997 | Muchnick et al. . |
| 5,644,731 | 7/1997 | Liencres et al. . |
| 5,964,855 | 10/1999 | Bass et al. ...................... 710/103 |

FOREIGN PATENT DOCUMENTS

| | | |
|---|---|---|
| 57-109228 | 7/1982 | Japan . |
| 2094271 | 4/1990 | Japan . |
| 5127777 | 5/1993 | Japan . |

OTHER PUBLICATIONS

IBM TDB vol. 35, No. 5, Oct. 1992, pp. 391–394.
IBM TDB vol. 34, No. 2, Jul. 1991, pp. 183–184.

*Primary Examiner*—Glenn A. Auve
*Attorney, Agent, or Firm*—Gerald R. Woods

[57] ABSTRACT

Method and system for controlling the state of a system bus during live insertion and removal of a pluggable feature card (FC) by driving control signals, which are transferred over the system bus, to an active signal level, or by driving down level active control signals to a low signal level near ground level. By this mechanism, the system bus becomes immune to signal disturbances and thereby allows pluggable units to be live inserted and removed without causing adverse effects to the system such as a system reset or compromise of data integrity. During live insertion or removal, a Live Insertion Bus Controller (LIBC) acquires access to the system bus through its interface with a System Bus Controller (SBC), after it has been signalled by a live insertion mechanism associated with the FC that the FC is in the process of being live inserted or removed. After system bus access has been acquired by the LIBC and the LIBC has taken over the control of the system bus, it drives a subset of the system bus set of control signals to a state that is immune from insertion/removal signal disturbance. In parallel, the LIBC effects suspension of running timeout and watchdog operations currently being performed by the SBC. When the LIBC is informed that the insertion process has been completed, the SBC again acquires control of the system bus. The same procedural steps are performed in case of removal of an FC.

22 Claims, 6 Drawing Sheets

METHOD AND SYSTEM FOR ENABLING NONDISRUPTIVE LIVE INSERTION AND REMOVAL OF FEATURE CARDS IN A COMPUTER SYSTEM

RELATED APPLICATIONS

This application is a continuation of application Ser. No. 08/826,789, filed Apr. 7, 1997, now U.S. Pat. No. 5,964,855.

BACKGROUND OF THE INVENTION

1. Field of the Invention

The present invention concerns computer systems in which pluggable units have to be inserted or extracted when the system is powered on. The invention particulary relates to a method and a system which allow the replacement or addition of such a unit without also requiring the system to be powered down thereby avoiding signal disturbances on a system bus of the computer system caused by that live insertion.

2. Description of the Related Art

Various apparatus and methods for the rapid interconnection of electrical circuits, such as peripheral device interfaces or control circuits to computer busses, are known in the art. In an effort to minimize the impact of plugging into a digital bus, the normal procedure has been to shut down or disable the bus so that new devices would not disrupt data flow on the bus. Hereby particular control circuits are utilized which usually contain a voltage regulator. Circuit interconnections to the bus and for power and data transfer are accomplished via edge connectors. The edge connectors are mounted on a printed circuit board which is plugged into a corresponding receptacle for connection to the bus. Plugging in the board establishes electrical contact between the edge connectors and the corresponding bus receptacle and thus both provides power to the electronic components on the board and interconnects it with the bus in one operation. For hot plugging, the common method of interconnection is to increase the length of at least the ground contact on the edge connector, so that a ground contact can be completed prior to the electrical connection of the other contacts for the application of power and the transfer of data signals.

Another concept for controlled insertion and removal of circuit modules which are interconnected by a bus is known from U.S. Pat. No. 4,835,737. According to the teaching of that reference, the operation of the bus is inhibited during the period a module is being inserted into a connector connected to the bus, and the bus is reactivated after the module has been inserted. When the module is to be inserted in an associated connector, a switch on the module is operated to provide an inhibit signal via the associated connector to a control circuit which inhibits operation of the bus. Upon full insertion of the module in the associated connector, the switch is operated to a second state in which the inhibit signal to the control circuit is reactivated. As a consequence, the control circuit again enables the bus to perform normal operations. However, quiescing of the bus during the insertion period has serious disadvantages, since there is no graceful way to manage peripherals or input/output (I/O) devices during the quiesce interruption.

A further approach is disclosed in U.S. Pat. No. 5,310,998 "Method and System for Placing a Bus on Hold During the Insertion/Extraction of an IC Card Into/From a Computer" assigned to Toshiba Corporation, which is particulary related to portable computers where a host IC card has to be inserted/extracted during operation of the computer. In such computer systems, when an IC card is extracted from an IC card holder, commonly a door has to be opened. A detection signal is output from a detecting circuit to a bus controller by detecting opening of the door. Upon receiving the detection signal, a hold request signal is output from the bus controller to a Central Processing Unit (CPU). In response to the hold request signal, a hold acknowledge signal is output from the CPU to the bus controller after the computer process to be executed is completed. A buffer control signal for disabling a buffer is output from the bus controller by receiving the hold acknowledge signal, thereby interrupting an access signal from the CPU, to hold a bus. As a disadvantage of that approach, there are no provisions which avoid bus disturbances of these signals which adversely affect the system, but allow further managing of peripherals during the live insertion procedure. Beyond that, the approach is not generally applicable to other live insertion systems. For example, it defines use of a door being opened or closed to indicate the progress of live insertion to the system. It requires the use of a buffer to isolate the CPU from the bus where live insertion occurs.

A further mechanism which provides the ability to quiesce a system bus in order to protect it against system malfunction is disclosed in IBM Technical Disclosure Bulletin Vol. 35, No. 5, October 1992, pp. 391–394, and entitled "Method for Card Hot Plug Detection and Control". The proposed method serves to control system bus signal disruptions that may occur as a result of card hot plugging. A receiver circuit on each card detects when a card has been inserted and causes the system bus to be quiesced. When the card has been fully inserted, powered-on, and is otherwise ready for system bus operation, the system bus is allowed to run. When card removal is detected via a service bus, the system bus can again be quiesced.

From IBM Technical Disclosure Bulletin, Volume 29, No.7, December 1986, page 2877, a circuitry is known for allowing a data cartridge to be hot plugged into an operating terminal without disrupting terminal operation. Other circuits are included in this circuitry to isolate the cartridge connector from the address, data and control busses to which it is logically connected. The buffer circuits are interposed between the cartridge connector and the busses to avoid bus noise. The buffer is kept in a high impedance state unless the presence of the cartridge has been indicated by an interrupt signal provided directly to a microprocessor.

An improved hot pluggable circuit is further disclosed in U.S. Pat. No 5,432,916 entitled "Precharge for Non-Disruptive Bus Live Insertion" which is assigned to IBM Corporation. That reference describes hot plugging of an electrical circuit into a separate non-quiesced signal network in an active system, such as a digital or an analog bus. The inventive concept proposed is the addition of a preconditioning network to precondition the electrical circuit to be hot plugged by partially precharging the parasitic input capacitances of the electrical circuit before hot plugging. The precharging of the parasitic input capacitances serves to minimize electrical transient effects on the active system. According to that approach each pluggable unit is precharged; the bus itself is not preconditioned.

When an electrical circuit such as a printed circuit board is inserted live into a signal network of an analog or digital system, the active system's signal voltage may be high, low, or a transition between these two states. No knowledge of the exact voltage level to be encountered is possible in an active system. Thus connection of the board to an analog or a digital bus can occur when the system signals are in any of the states noted above.

A more specific approach to prevent turbulence from being generated on a bus line when a bus connected substrate, i.e. a pluggable unit, is inserted or extracted in a hot-line state of a computer system, is disclosed in Japanese patent publication No. JP 512 7777 entitled "Substrate Insertion and Extraction in Hot-Line State" which is assigned to Fujitsu Ltd. The substrate is equipped with a first connector and a second connector. Through the first connector the substrate is connected to the bus of a CPU and a power source, wherein the second connector serves to connect the substrate to an electric power supply. Further a switch is provided which is operated at the time of insertion or extraction of the substrate in the hot-line state, as well as an interruption initiating circuit which initiates an interruption to the CPU when the switch is operated and first and second attachment/detachment detecting circuits. The first of these circuits generates a first connector attachment/detachment signal when the first connector is connected; the second circuit generates a second connector attachment/detachment signal when the second connector is connected. In particular a bus driver control circuit is provided which holds a bus driver high in impedance with the aforementioned connector signals. Further, a write register which holds the permission for insertion or extraction of the CPU in the hot-line state and which generates an insertion/extraction permission signal, is provided. When the CPU issues the permission for insertion or extraction in hot-line states, bus access is stopped. Thus the subject matter of that patent publication also depends on holding and stopping the bus, and placing it in a high impedance state during live insertion. But there are no additional provisions for immunity to spurious disturbances. A switch is used to interrupt the CPU's operation analogous to the door as in U.S. Pat. No. 5,310,998 cited above.

Another approach where the bus is set to a high level is disclosed in Japanese patent publication No. JP 2094 271 entitled "Interface Package" which is assigned to NEC Corporation. In order to prevent an adverse effect on the bus it is particulary proposed to use connector pins with two kinds of lengths, and setting the bus output to an open high level. The upper pins and lower pins of an interface package (IP) are set to long pins; the intermediate pins are set to short pins. A specific pin of the long pins is assigned as power terminal, it is first brought into contact when the IP is inserted, and it is last separated when the IP is removed. The long pins are adapted for a power cut-off detecting integrated circuit (IC) and a buffer IC. When the IP is inserted, the detecting IC is operated as soon as the terminal is brought into contact with the IP, and the output of the buffer IC is set to an open high level. Therefore that invention allows the bus to flood to an open high level during the live insertion progress. The sequencing during live insertion is controlled with different staggered pin lengths versus a door as in U.S. Pat. No. 5,310,998 or a switch as in the JP 512 7777. Staggered pin length sequencing, however, is not at issue for the present invention.

SUMMARY OF THE INVENTION

It is an object of the present invention to provide a method and a system which allow the replacement or addition of a pluggable unit without also requiring the underlying computer system to be powered down.

Another object of the invention is to provide a live insertion method and system being largely independent of the characteristics of an underlying bus system and thus allowing live insertion capability to be added subsequently, and enabling live insertion of pluggable units into a system bus which is not designed to support live insertion capability.

A further object is provision of a live insertion method and system which avoid system bus disruptions of a computer system caused by uncharged capacitances on a plugged unit.

According to one aspect of the invention, there is provided a method for controlling the state of a system bus during live insertion/removal of a pluggable unit by driving control signals which are transferred over the bus to an active signal level, or by driving "down level" active control signals to a low signal level near ground level. By this the system bus becomes immune to signal disturbances and thereby allows pluggable units to be live inserted and removed without causing adverse effects to the system such as a system reset or compromise of data integrity.

According to another aspect of the invention, bus pseudo operations i.e. no-operations (NOOPs), are created such that normal system functions are not adversely affected. The term "bus pseudo operations" defines the resulting state of the bus after the required subset of control signals are driven to active down levels.

In addition, the invention provides an information processing system wherein the above methodological concept is implemented, and a live insertion tool which can be connected to the computer system in order to enable live insertion/removal of pluggable units.

The live insertion capabilities according to the present invention allow the replacement or addition of pluggable units without also requiring the system to be powered down. This in turn enhances the continuous availability characteristics of the system by allowing continued operation during service, change, or hardware upgrade operations. It is emphasized that the corruption of bus signal integrity and possible adverse effects to the system is a concern even though the system bus may be quiesced during card live insertion or removal. This is the case since the uncharged capacitance of a signal on a card being introduced represents an instantaneous short to ground for the corresponding system bus signal.

Beyond that, the invention has the following further advantages over the prior art. First it enables live insertion without catastrophic disruption, while preserving signal integrity for system busses or standard bus systems (architectures) not expressly designed to support feature card live insertion and removal, such as the IBM Micro Channel; the IBM GHBA Adapter Bus (GAB), a bus architecture defined for Generic High Bandwidth Architecture (GHBA) and used to interconnect GHBA adapters, which has been developed by IBM for fast packet switching; the Peripheral Component Interconnect (PCI) bus standard; the particular VME/VME64 (Versa Module Eurocard) system bus standard; and the ISA and EISA bus specifications where this invention is also applicable. Therefore it is largely independent of the characteristics of the underlying system bus in allowing the live insertion capability to be implemented by way of addition which thus can be realized by a separate tool as cited above. Also it does not require logic changes to the system bus interface of the respective pluggable units in order to make them live insertable. Further the solution is applicable to standard and widely available busses wherein no massive re-design is required. Therefore, the proposed solution is independent from the software running in the underlying system since the necessary hardware operates the same as other bus masters, i.e. no software changes are required beyond configuration changes. Further advantages of the invention over the prior art are discussed or will become evident with regard to the following detailed description.

DETAILED DESCRIPTION OF THE PREFERRED EMBODIMENT

An embodiment of the present invention will now be described in detail with reference to the accompanying drawings.

Figure 1:
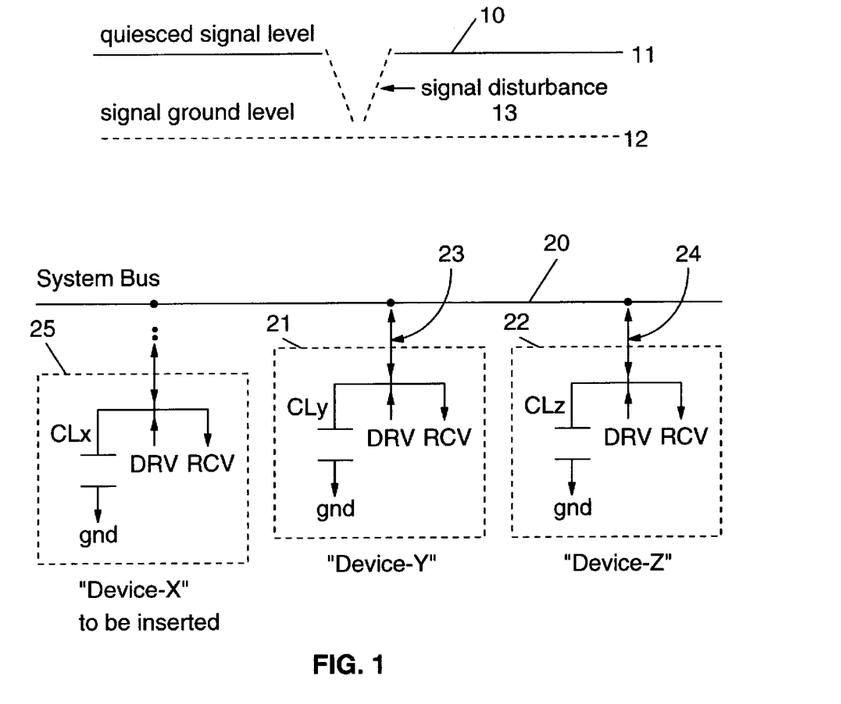
FIG. 1 schematically illustrates the effect to a bus signal that is quiesced to a high state and where live insertion disruption of that signal is caused by connecting uncharged capacitance load presented by a dynamically inserted feature card.

The upper part of the schematic diagram depicted in FIG. 1 shows a typical situation where a bus signal 10 is quiesced to a high state 11 above signal ground level 12. The shown signal disturbance 13 towards ground level is caused by insertion of a pluggable unit into the quiesced system bus. It is noted that corruption of bus signal integrity and possible adverse effects to a computer system are a concern even though the system bus may be "quiesced" during card live insertion and/or removal.

In the lower part of the diagram, a system bus 20 is presented where two devices 21, 22 are already connected to the bus via lines 23, 24 and where another device 25 is going to be connected to the bus. All these devices comprise driving (DRV) and receiving signal lines (RCV) and thereupon uncharged capacitance loads (CLx, CLy, CLz) to ground. That uncharged capacitance, or current sink, being introduced represents an instantaneous short to ground for the corresponding system bus signal. If the device 25 is inserted into a connector of the system and thus connected to the system bus, that insertion causes false switching on the quiesced system bus signals at a high level. That signal disturbance is illustrated with respect to the upper part of the diagram.

It is noteworthy that live insertion does not cause any false switching on a signal at a low or ground level, i.e. the critical control signals for most well known system busses are "down level" active. This means that the critical control signals must be a more negative level, i.e. a level near signal ground, in order to control bus operations.

Figure 2:
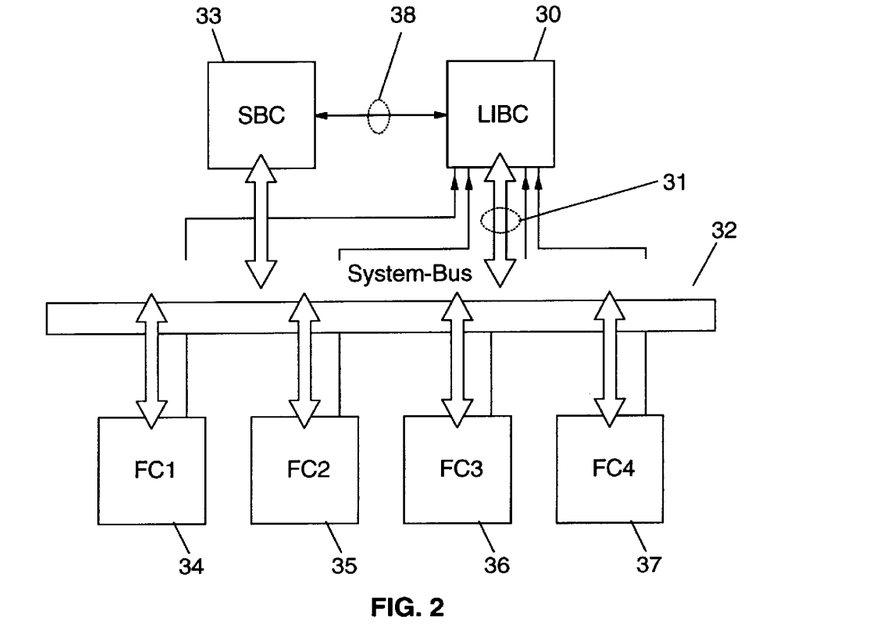
FIG. 2 is a block diagram which depicts information processing system components according to a preferred embodiment of the invention.

FIG. 2 shows the basic components of the preferred embodiment of the invention where the aforementioned functionality is implemented as a separate Live Insertion Bus Controller (LIBC) 30 which has interfaces 31 with a system bus 32 of an information processing system and an existing System Bus Controller (SBC) 33. Although the LIBC function is shown as a separate unit in this embodiment, it is also conceivable to integrate it within the SBC. In the embodiment depicted in FIG. 2, four pluggable units 34–37 which represent feature cards (FCs), each containing electronic circuitry, are connected, or can be connected, to the system bus.

In any case, there has to be some level of coordination between the operation of the SBC 33 and the LIBC 30 as indicated by an interface 38 between them. As will be discussed later in more detail, that coordination concerns, for instance, suspension of system bus timeout and watchdog operations during feature card insertion/removal. According to this embodiment, that interface is particulary used both to gain access to the system bus, e.g. through an ordinary system arbitration mechanism, and to either suspend system bus timeout/watchdog operations for the duration of live insertion/removal or to suppress any error reporting and recovery actions that might result from a timeout.

In the preferred embodiment, the Live Insertion Bus Controller (LIBC) 30 attaches only to critical system bus control signals which are concerned by the signal disruption, i.e. some subset of those signals and in particular to some subset of down level active control signals, that determine which pseudo system bus operations are to be performed.

Figure 3:
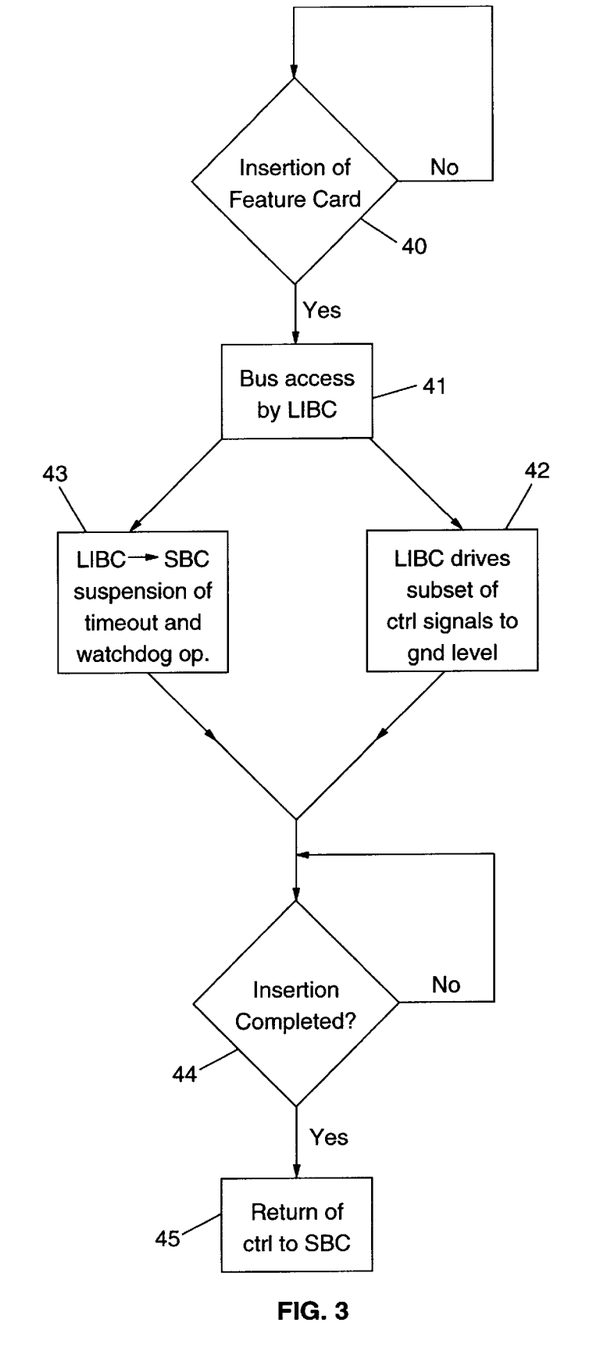
FIG. 3 is a flow chart illustrating a preferred procedure for live insertion of a feature card into/from a bus system.

The flow chart diagram in FIG. 3 illustrates preferred procedural steps for live insertion (and removal) of a feature card into and from a bus system. The LIBC 30 acquires access to the system bus (block 41) through its interface with the System Bus Controller (SBC) 33 after it has been signalled by the live insertion mechanism associated with a feature card (FC) that the FC is in the process of being live inserted or removed (block 40). After system bus access has been acquired by the LIBC and the LIBC has taken over the control of the system bus, the LIBC drives a subset of the system bus set of control signals (block 42) to a state that is immune from insertion/removal signal disturbance and which is ground level in this embodiment. In parallel, the LIBC effects suspension of running timeout and watchdog operations (block 43) currently being performed by the SBC. When the LIBC is informed that the insertion process has been completed (block 44), the SBC again acquires control of the system bus (block 45). The same procedural steps are performed in case of removal of an FC. Further aspects of the procedural steps become evident with respect to FIG. 5 which shows the SBC-LIBC interface in more detail.

Therefore a mechanism is needed which defines and controls the start and the end time for the LIBC to become master of the system bus. As already mentioned, the LIBC has to receive from the FCs or mechanisms associated with the FCs, signals which indicate the state of live inserting the FC. In this regard, reference is made to two prior art publications cited above, i.e., JP 2094 271 and U.S. Pat. No. 4,835,737 both of which are fully incorporated by reference herein. The known approaches provide long and short stagger length contact pins in the target FC connector for the electrical connection between an FC and the system bus. The point of time when an FC is about to be inserted or has been completely removed, can be indicated by a long contact pin or equivalent means. Correspondingly, when an FC has been completely inserted or is about to be removed, can be indicated by a short contact pin or an equivalent thereof.

Figure 4:
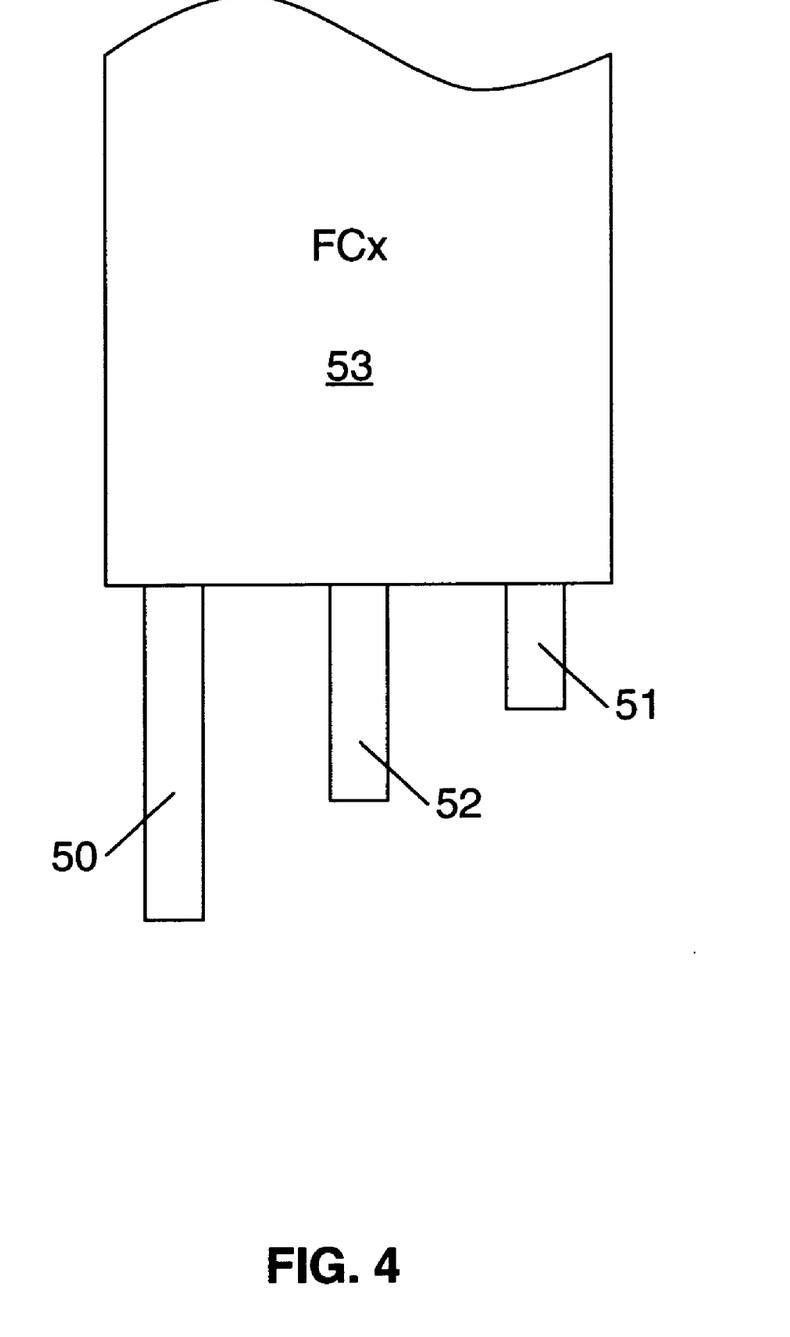
FIG. 4 is a schematic diagram showing mechanical detector elements for the indication of the insertion/removal process of a feature card.

In the preferred embodiment of the invention, additional contact pins 50, 51 besides the pin 52 used for the connection to the system bus, are provided which enable indication of the insertion of an FC 53 before the internal bus of the FC and the system bus are interconnected. This is illustrated with reference to FIG. 4. The beginning of insertion is detected by a long pin 50, whereas the end of the insertion process is indicated by a short pin 51. In the case of removal of an FC that functionality of the two pins is reversed. Other techniques include mechanical switches which are activated prior to insertion operations, card sensing mechanisms, or a combination of these techniques. The minimum requirements are sufficient time to start the system bus acquisition by the LIBC prior to making or breaking contact with the card pins and an indication of when these operations may be terminated after the card has been properly seated or completely removed from the system. It is noted that this timing requirement is ordinarily a function of the mechanical velocity associated with feature card live insertion.

Figure 5:
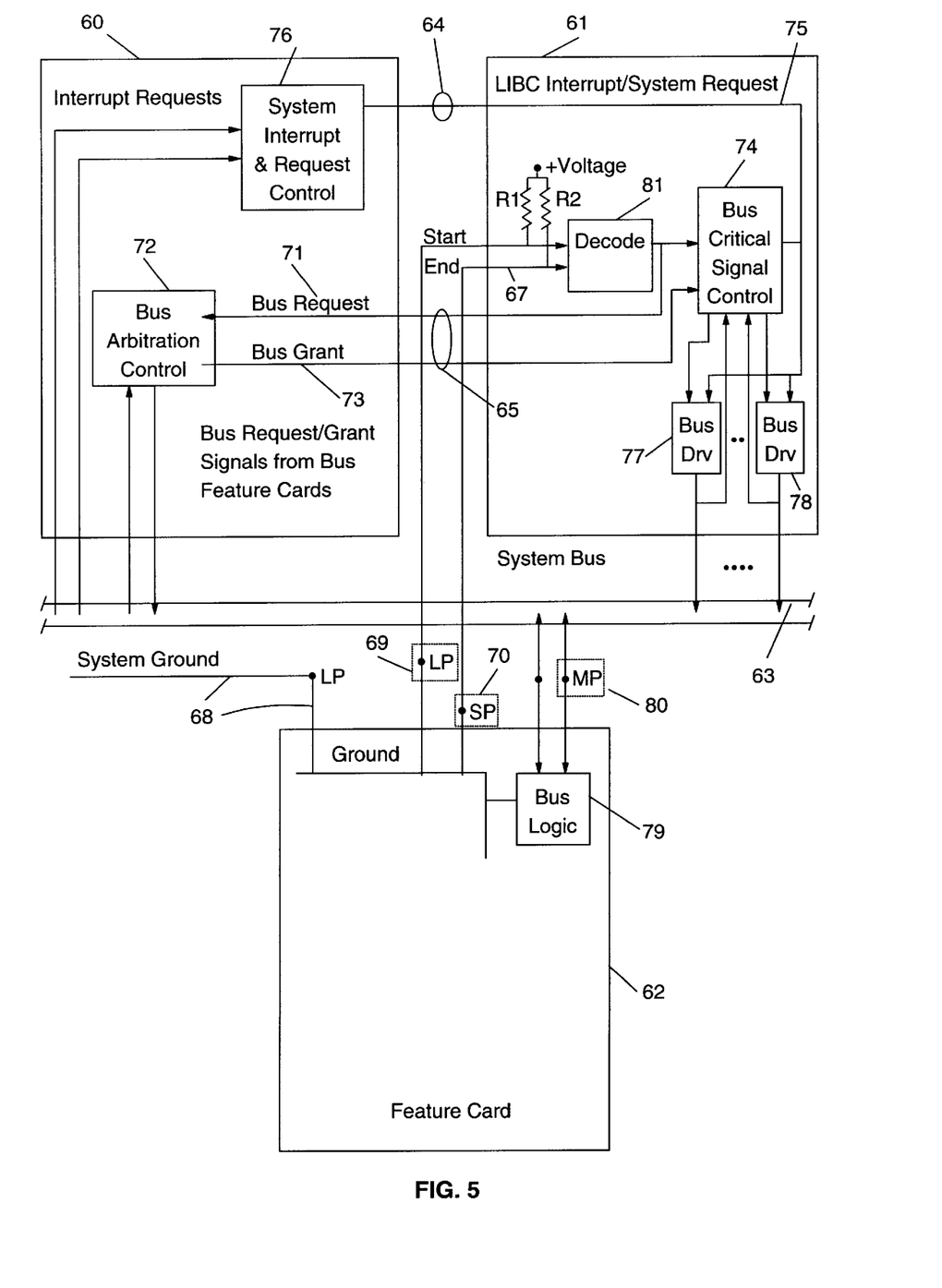
FIG. 5 is a more detailed block diagram of the System Bus Controller (SBC) and the Live Insertion Bus Controller (LIBC) as shown in FIG. 2.

FIG. 5 is a more detailed block diagram of a System Bus Controller (SBC) 60 and a Live Insertion Bus Controller (LIBC) 61 according to the preferred embodiment. It shows the details of a control logic for an SBC 60, a LIBC 61, and a Feature Card 62 in this embodiment. These logic components are interconnected over a system bus 63 and a bidirectional interface 65 between the SBC and the LIBC. In the LIBC, pullup resistors 'R1' and 'R2' hold the state of signals 'Start' 66 and 'End' 67, respectively, at a high (H) state until pulled low (L) by connecting them to 'System Logic Ground' 68 through corresponding long-pin (LP) 69 or short-pin (SP) 70 connections on the Feature Card 62 which is being live inserted or removed from the system. Note that there are alternative implementations of the Start/End function. If a voltage is available to the Feature Card that is supplied on a long-pin that can be used to power logic circuits, a signal can be implemented that falls (or rises) on the Start condition and rises (or falls) on the End condition.

A Decode logic 81 decodes the state of Start and End as follows:

| Start | End | Decode State |
| --- | --- | --- |
| H | H | Feature Card not present |
| L | H | Card insertion/removal in process |
| L | L | Feature Card present |
| H | L | invalid state |

A LIBC Bus Critical Signal Control logic 74 activates a 'Bus Request' 71 to an SBC Bus Arbitration Control logic 72 when the state of the Start/End Decode indicates that a Feature Card is being inserted or removed. When the Bus Arbitration Control logic 72 responds to the 'Bus Request' 71 with a 'Bus Grant' 73 indicating that the LIBC 61 may take over control of the bus 63, the Bus Critical Signal Control logic 74 examines the state of the 'Bus Critical' signals (if necessary, according to the specification of the particular bus) and activates a 'LIBC Interrupt' or 'LIBC Request' signal 75. The 'LIBC Interrupt/Request' signal 75 indicates to a SBC System Interrupt & Request Control logic 76 that any timeout or watchdog functions should be suspended during the time that the LIBC 61 takes over control of the bus 63. Also, the LIBC Interrupt/Request signal 75 causes a number of Bus Driver (Bus Drv) circuits 77, 78 connected to the Bus Critical Signal Control logic 74 to be driven to a ground or signal low-level. These Bus Driver circuits 77, 78 are the same as those specified for implementing the particular system bus (e.g., TTL tri-state, TTL open-collector, PCI bus drivers, etc.). The 'Bus Critical' signals are thus at a ground or signal low-level state prior to the Feature Card 62 being connected to or disconnected from the bus signals. A Feature Card Bus logic 79 signals connection to the system bus 63 through medium-length (MP) pins 80 which make connection after the long-pins (LP) 69 during card insertion and which break connection after the short pins (SP) 70 during card removal.

When the Start/End Decode logic 81 indicates that a hot-swap insertion or removal of a card 62 has been completed (i.e., "Feature Card present or not present" is indicated rather than "card insertion/removal in process"), the Bus Critical Signal Control logic 74 then inactivates its 'Interrupt Request', which allows the 'Bus Critical' signals to return to an inactive state, and also inactivates its 'Bus Request'.

An SBC 60 typically implements watchdog functions to detect situations where the system bus is hung or dominated by a particular device. In case of a timeout, common watchdog implementations generate a 'system reset' signal or a 'machine check reset' signal. Since the time to hot-plug an FC is determined by the mechanical time of insertion and removal, and since this can be a relatively long time, it may be necessary for some SBC's to disable the watchdog timer during a hot-plug sequence.

Another particular feature of the invention is that only critical control signals, i.e. signals which are down-level active and therefore are prone to uncharged signal line capacitances (short to ground) introduced to the bus system by insertion of a pluggable unit, are driven to an active or down level making the system bus immune to being disturbed by live insertion of such a unit. It is emphasized that the critical control signals for different bus architectures are also quite different. For several bus architecture control signals, reference is made to FIGS. 6–9 and the following description.

Micro Channel Bus Environment

Control of the system bus is given over to the LIBC during feature insertion or extraction. Control is returned to the SBC after an FC has been fully inserted into or removed from the system. In essence, the LIBC is analogous to a special bus master with capabilities that allow it to control the bus during live insertion and to ensure system integrity. In particular, this special bus master functionality allows application of the invention to busses which are not designed for live insertion to add this capability.

Figure 6:
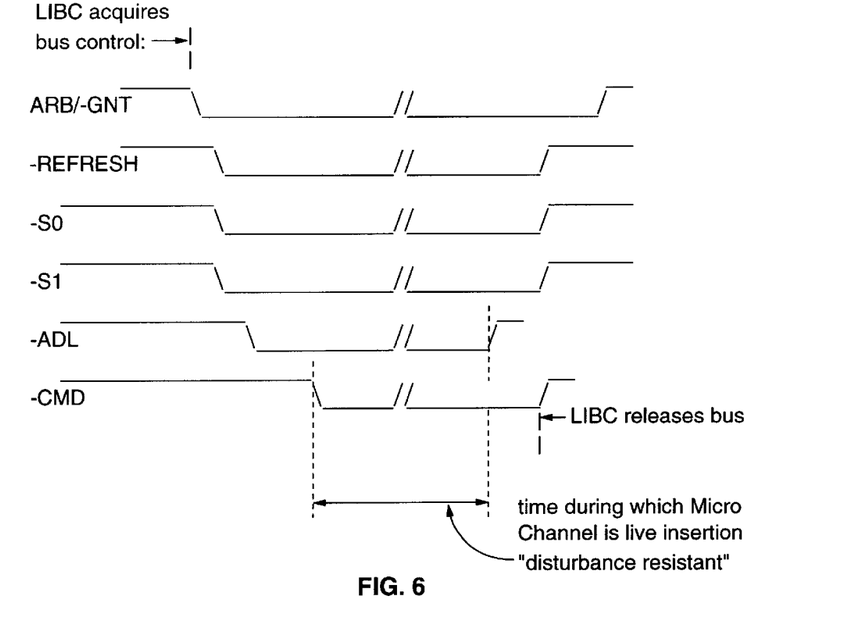
FIGS. 6 to 9 are timing charts depicting exemplary bus protocols with respect to different environments for application of the invention where live insertion of a functional card is accomplished via a Micro Channel Interface, a GAB Interface, a PCI Interface, and a VME-Bus Interface architecture, respectively.

FIG. 6 shows the timing during live insertion for the critical controlling signals for the Micro Channel during LIBC pseudo operations. In this architectural environment the critical controlling signals are:

—ADL (—Address Decode Latch) This signal, driven by the controlling bus master, is provided as a convenient way for the bus slave to latch address decodes and status bits on the Micro Channel bus.

—REFRESH This signal is driven by the system logic and is used to indicate that a memory refresh operation is in progress. Memory slaves that do not need to perform refresh operations do not need to receive this signal.

—CMD (—Command) This signal is driven by the controlling bus master and is used to define when data on the data bus is valid. The trailing edge of this signal indicates the end of the bus cycle. This signal indicates to the bus slave how long data is valid. During write cycles, the data is valid as long as —CMD is active. During read cycles, the data is valid after the leading edge, but before the trailing edge of —CMD, and is held on the bus until —CMD goes inactive. Slaves can latch address and status information with the leading edge of —CMD.

—S0,—S1 (—Status 0,-Status 1) These status signals are driven by the controlling bus master to indicate the start of a data transfer cycle and also define the type of data transfer. When used with M/—IO (Memory/—Input Output), memory read or write cycles are distinguished from I/O read or write cycles. These signals are latched by the bus slave, as required, using the leading edge of —CMD, or the leading edge of —ADL.

ARB/—GNT (Arbitrate/—Grant) Only the central arbitration control point drives this signal. The negative-to-positive transition of ARB/—GNT initiates an arbitration cycle. When in the ARB state, this signals indicates an arbitration cycle is in progress. When in the —GNT state, this signal indicates the acknowledgement from the central arbitration control point to the arbitrating participants and the DMA (Direct Memory Access) controller that the channel ownership has been granted. This signal is driven to the ARB state by the central arbitration control point following the end of transfer (EOT). It is noted that the central arbitration control point usually is implemented in the SBC.

When the LIBC has received an indication signal from the target FC that it is going to be inserted, the LIBC acquires control of the system bus via the bus arbitration signal "ARB/—GNT". At this time the LIBC starts driving down the "ARB/—GNT" signal towards logical zero level. The time interval designated by "//" indicates the variable mechanically determined time for the live insertion/removal procedure of an FC into/from the system bus. According to the IBM Micro Channel bus protocol for which reference is made to the "Micro Channel Architecture" section in the "IBM Personal System/2 Hardware Interface Technical Reference—Architectures" (IBM P/N 84F8933), the "—REFRESH", "—S0", and "—S1" command signal levels are driven to a logical zero level with a one cycle delay. This is also valid for the "—ADL" and "—CMD" signals. At the time all critical bus command signals have been driven to ground, the Micro Channel becomes live insertion disturbance resistant. It is emphasized that depending on the particular underlying bus system, this subset of signals needs to be driven active and released to be inactive in a particular sequence.

The time of that disturbance resistance endures until the first critical command signal returns to the starting point level. In this environment, the first signal is the "—ADL" command which terminates the resistance time interval and for the aforementioned reasons the insertion/removal process must have been finished at that time. The fact that the "—ADL" signal is driven to a high level before the LIBC releases the bus is required by the architectural definition of the Micro Channel bus. Hereafter, the period of "resistance" for Micro Channel endures through the time that the critical signal "—ADL" returns to the starting point level. The other critical signals are at an active or low-signal level during this period (FIG. 6). For more detail on the Micro Channel critical bus command signals, the reader is referred to the "Micro Channel Architecture" section in the reference identified above. Therefore the indication signal from the FC indicating the end of the insertion/removal process has to be received by the LIBC after that time.

There exist a number of other Micro Channel bus protocol commands which require special consideration but are not shown in FIG. 6:

CHRESET (channel reset) is a positive asserted signal which needs to be wired point-to-point to each FC slot or to be driven actively to a deasserted down level during feature card live insertion;

14.3 MHz OCS free running clock signal must be isolated and wired point-to-point to each slot;

—IRQn (interrupt request) signals must be isolated from the system processor which can be accomplished via control of the SBC or with isolation gating logic;

—CHCK (channel check) signal is either a "don't care" during LIBC controlled pseudo operations or must be isolated from the system processor in the same way as the —IRQn signals.

In addition, it is assumed that no FC in the system has a requirement for refresh cycles since none can be generated during the insertion process. Also, since the FC which is live inserted is powered-off during insertion, it does not need refresh cycles.

GHBA GAB Environment

Figure 7:
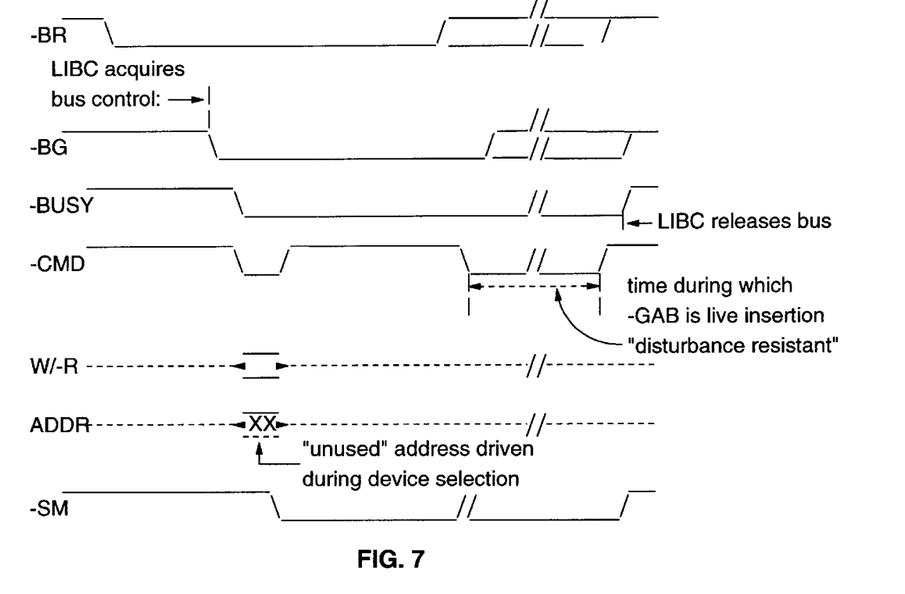

For the GHBA GAB architecture, the critical signals as shown in FIG. 7 are —BR, —BG, —BUSY, —CMD, —SM, and —RESP. The "< >" means this signal could be high or low, but it must be one or the other of these states and not alternating between high and low. "<XX>" means that the address signals must have some specified value and this value is to be in a set of addresses not currently being used by the system, for instance, reserved system addresses. The split portion of the deassertion of the "—BR" and "—BG" signals indicate that the bus architecture allows these signals to be high or low during this time.

PCI Bus Environment

Figure 8:
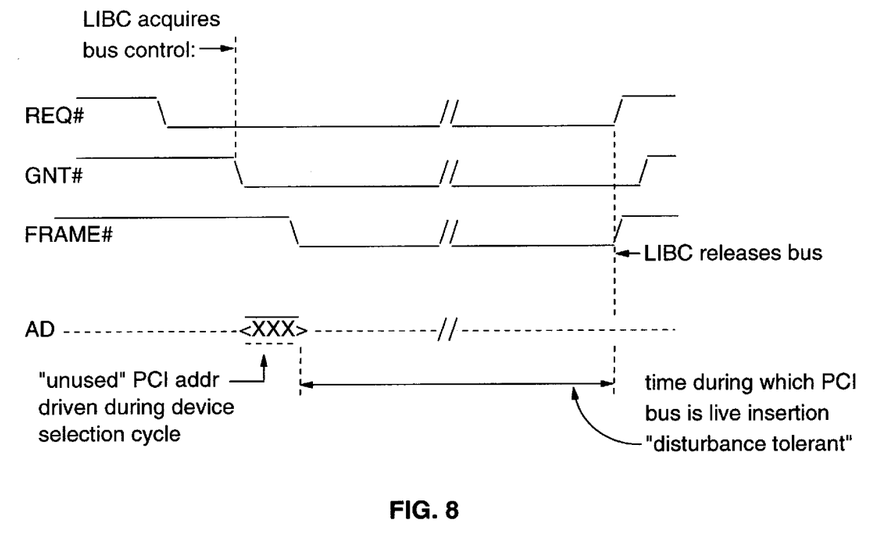

For the PCI Bus the only critical signal among those shown in FIG. 8 is FRAME# where the '#' sign indicates a negative asserted signal. The time behaviour of the "<XXX>" address signal is shifted in accordance with the "<XX>" signal in FIG. 7.

VME/VME64 Bus Environment

Figure 9:
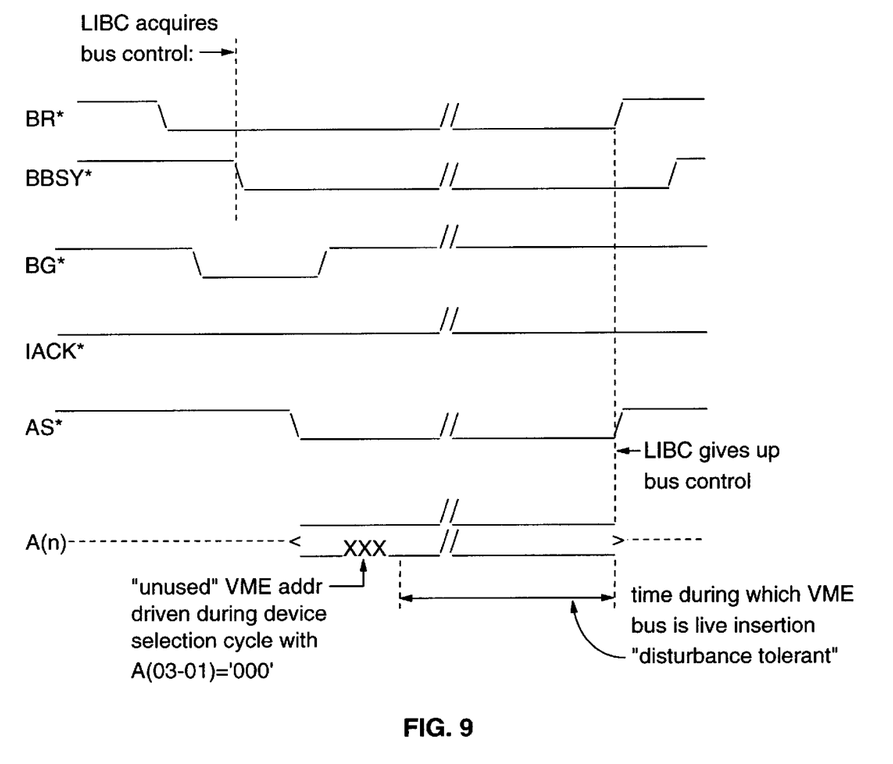

For the VME/VME64 Bus the critical signals depicted in FIG. 9 are BBSY* and AS* where the '*' sign indicates a negative asserted signal.

A mechanism is also provided that controls the state of non-time critical signals that are high level active such as a '—RESET' control signal or that must be kept from being asserted to an active low level such as a system '—ERROR' signal.

—RESET: The system controls the state of this signal during live insertion by wiring an individual —RESET signal to each FC slot position. Once this is done, the individual —RESET for an unoccupied slot may be asserted without affecting the operation of Feature Cards in occupied slots. Also, if the system chooses not to assert —RESET until a FC slot is occupied, any disturbances to —RESET that occurred during live insertion operations do not propagate to the occupied and operational FC slots.

—ERROR: The system controls the effect of this signal by using the LIBC Interrupt/Request signal to the SBC to indicate that error reporting is to be inhibited or blocked during the time that live-insertion bus pseudo operations are occurring or if, for example, an error bit should be set in an error status reporting register, it is to be cleared by the system upon completion of the live-insertion bus pseudo operations.

In contrast to non-time critical signals, critical timing signals such as clocks are distributed point-to-point to each device that can be live inserted so that disturbing the clock for such a device does not propagate to other devices which interface to the bus. The distribution of clocks in this manner may be necessary with respect to the requirements for controlling clock skew for higher performance busses. It is common practice for high performance clocked synchronous busses (i.e., see "PCI Local Bus Specification", Revision 2.1) to provide an individual clock to each FC slot for the purpose of controlling clock skew. A clock driver with multiple clock outputs would ordinarily be provided by the SBC logic. This also serves the purpose of isolating any live-insertion disturbance to a bus clock to the slot with an FC being live-inserted (i.e., the FC slots that are occupied and operational each have a bus clock that is not connected to the slot where a live-insertion operation is taking place).

A particular implementation of the invention is a tool which is a separate unit with respect to the LIBC and can be connected to a system bus prior to a live insertion procedure and disconnected again after the insertion procedure is complete. The LIBC tool, for instance, may be implemented as an adapter card, planar card, or other diagnostic tool, such as a "black box" that a customer engineer may carry with him or install in a target system at some time before it is to be used. The tool would be interfaced to the target system to which live insertion capability is to be added by either connecting the adapter card or planar to the target system, or by interconnecting the tool or "black box" to the target system. Prior art methods may be used to dynamically connect the tool to the target system while the system is in operation (i.e. precharge, staggered pins, etc.). Once the tool is connected to the target system, temporary LIBC capability is added through the tool. With this capability now installed, live insertion capability is provided through the LIBC introduced into the system by the tool. With the LIBC tool installed, cards or features in the target system may now be live inserted or live removed. This may be used to remove or reinsert cards to locate the source of hardware faults, or other system problems. This may also be used to allow dynamic addition or removal of devices, and therefore dynamic reconfiguration of the hardware resources in the system. This tool may later be removed and taken away by a customer engineer to resolve problems in other target systems. The LIBC tool can be a portable means for a customer engineer to bring live insertion capability to a customer system for the above operations, but it is by no means limited in potential uses to those mentioned.

Although a specific embodiment of the present invention has been illustrated in the accompanying drawings and described in the foregoing detailed description, it will be understood that the invention is not limited to the particular embodiments described herein, but is capable of numerous rearrangements, modifications and substitutions without departing from the scope of the invention. The following claims are intended to encompass all such modifications.

What is claimed is:

1. A method of live-inserting pluggable units into an information processing system, said system having a processor, memory and at least one slot for accepting a pluggable unit, said processor, memory and slot being directly connected through a common bus, circuitry for detecting the insertion of said pluggable unit into said slot and a bus controller for controlling the operation of said bus, the method comprising the steps of:

identifying at least one down-level active control signal being transferred over said bus that, when asserted, produces a state on said bus in which no bus operations are being performed;

determining a start time and an end time associated with the insertion of said pluggable unit into said slot;

ceasing bus activity at least in a time interval between said start time and said end time; and driving said down-level active control signal of said system bus to a low level at least in a time interval between said start time and said end time.

2. The method of claim 1 further comprising the steps of:

determining a point in time when said pluggable unit is properly connected to said bus through said slot;

terminating said ceasing of bus activity after said point in time has been reached; and terminating said driving of said down-level active control signal to a low level after said point in time has been reached.

3. The method of claim 1, further comprising the step of:

distributing timing signals point-to-point from the origin of said timing signals to at least one slot in said system.

4. A system supporting the live insertion of pluggable units, comprising:

a processor, memory and at least one slot for accepting a pluggable unit, said processor, memory and slot being directly connected through a common bus carrying at least one down-level active control signal that, when asserted, produces a state on said bus in which no bus operations are performed;

an insertion detection device which determines a start time and an end time associated with the insertion of said pluggable unit into said slot;

a bus controller for ceasing bus activity at least in a time interval between said start time and said end time; and bus driving circuitry which drives said down-level active control signal of said bus to a low level at least in a time interval between said start time and said end time.

5. The system of claim 4 wherein said insertion detection circuitry determines a point in time when said pluggable unit is properly connected to said bus through said slot.

6. The system of claim 5 wherein said bus controller terminates said ceasing of bus activity after said point in time has been reached.

7. The system of claim 5 wherein said bus driving circuitry terminates said driving of said down-level active control signal to a low level after said point in time has been reached.

8. The system of claim 4, further comprising:

signal lines carrying timing signals that are distributed point-to-point from the origin of said timing signals to at least one slot in said system.

9. The system of claim 4, wherein said pluggable unit comprises:

start signal generation circuitry which provides a start signal to said insertion detection device indicating the start of an insertion of said pluggable unit into said slot;

end signal generation circuitry which provides an end signal to said insertion detection device indicating the end of an insertion of said pluggable unit into said slot; and a connector for coupling said pluggable unit to said bus through said slot in an interval between the providing of said start signal and said end signal.

10. A live insertion bus control device for controlling the state of a bus during the live insertion of pluggable units into an information processing system, said bus directly connecting a processor, memory and at least one slot for accepting a pluggable unit, the insertion bus control device comprising:

an insertion detection device which determines a start time and an end time associated with the insertion of said pluggable unit into said slot;

a bus controller for ceasing bus activity at least in a time interval between said start time and said end time; and bus driving circuitry which drives at least one down-level active control signal to a low level at least in a time interval between said start time and said end time, such that a state is produced on said bus in which no bus operations are performed.

11. The live insertion bus control device of claim 10, further comprising:

an interface for providing temporary live insertion capability to said information processing system.

12. A method of live-removing pluggable units from an information processing system, said system having a processor, memory and at least one slot for accepting a pluggable unit, said processor, memory and slot being directly connected through a common bus, circuitry for detecting the removal of said pluggable unit from said slot and a bus controller for controlling the operation of said bus, the method comprising the steps of:

identifying at least one down-level active control signal being transferred over said bus that, when asserted, produces a state on said bus in which no bus operations are being performed;

determining a start time and an end time associated with the removal of said pluggable unit from said slot;

ceasing bus activity at least in a time interval between said start time and said end time; and driving said down-level active control signal of said system bus to a low level at least in a time interval between said start time and said end time.

13. The method of claim 12 further comprising the steps of:

determining a point in time when said pluggable unit is properly disconnected from said bus through said slot;

terminating said ceasing of bus activity after said point in time has been reached; and terminating said driving of said down-level active control signal to a low level after said point in time has been reached.

14. The method of claim 12, further comprising the step of:

distributing timing signals point-to-point from the origin of said timing signals to at least one slot in said system.

15. A system supporting the live removal of pluggable units, comprising:

a processor, memory and at least one slot for accepting a pluggable unit, said processor, memory and slot being directly connected through a common bus carrying at least one down-level active control signal that, when asserted, produces a state on said bus in which no bus operations are performed;

an removal detection device which determines a start time and an end time associated with the removal of said pluggable unit from said slot;

a bus controller for ceasing bus activity at least in a time interval between said start time and said end time; and bus driving circuitry which drives said down-level active control signal of said bus to a low level at least in a time interval between said start time and said end time.

16. The system of claim 15 wherein said removal detection circuitry determines a point in time when said pluggable unit is properly disconnected from said bus through said slot.

17. The system of claim 16 wherein said bus controller terminates said ceasing of bus activity after said point in time has been reached.

18. The system of claim 16 wherein said bus driving circuitry terminates said driving of said down-level active control signal to a low level after said point in time has been reached.

19. The system of claim 15, further comprising:

signal lines carrying timing signals that are distributed point-to-point from the origin of said timing signals to at least one slot in said system.

20. The system of claim 15, wherein said pluggable unit comprises:

start signal generation circuitry which provides a start signal to said removal detection device indicating the start of a removal of said pluggable unit from said slot;

end signal generation circuitry which provides an end signal to said removal detection device indicating the end of a removal of said pluggable unit from said slot; and a connector for coupling said pluggable unit to said bus through said slot in an interval between the providing of said start signal and said end signal.

21. A live removal bus control device for controlling the state of a bus during the live removal of pluggable units from an information processing system, said bus directly connecting a processor, memory and at least one slot for accepting a pluggable unit, the removal bus control device comprising:

a removal detection device which determines a start time and an end time associated with the removal of said pluggable unit from said slot;

a bus controller for ceasing bus activity at least in a time interval between said start time and said end time; and bus driving circuitry which drives at least one down-level active control signal to a low level at least in a time interval between said start time and said end time, such that a state is produced on said bus in which no bus operations are performed.

22. The live removal bus control device of claim 21, further comprising:

an interface for providing temporary live insertion capability to said information processing system.

* * * * *